NO PRINTED SPECIFICATION AVAILABLE
8724X
S. Graham.
Flocking Mach.
No.
Patented Mar. 27, 1835.
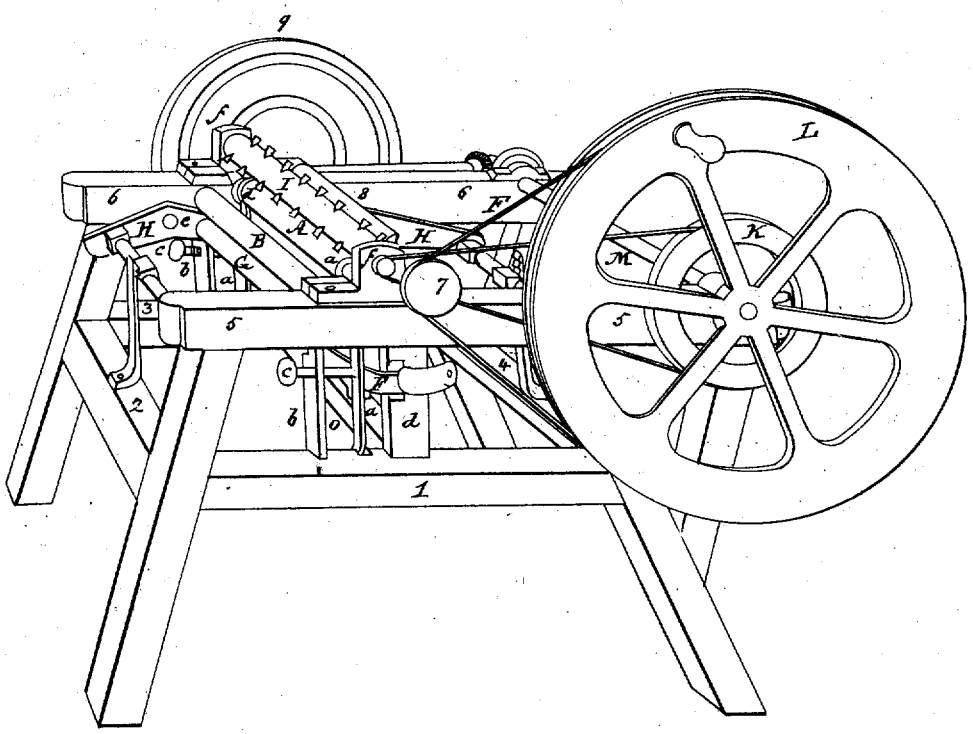
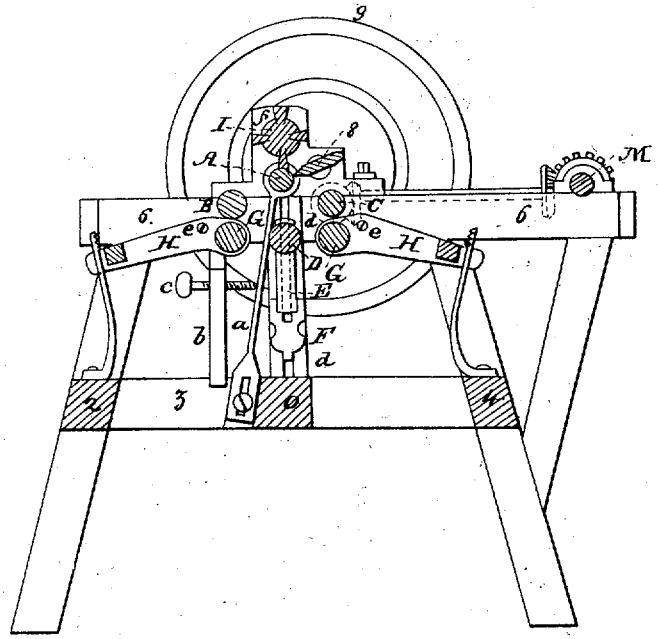

March 27, 1835 8724X 93.

Seth Graham of Farmington Maine

Letters Patent

The Schedule referred to in these Letters Patent and making part of the same containing a description in the words of the said Seth Graham himself of his improvement in a machine for extracting hair from Hatters and other Fur Skins.

To all to whom these presents shall come. Be it known that I Seth Graham of Farmington in the County of Kennebec and State [Maine] Hatter - have Invented a new and useful improvement in a machine for extracting Hair from Hatters and other Fur Skins and the following is a full and accurate description of the construction and operation of my said improvement. The form of the machine and the general arrangement of the several parts of the machinery are represented in the accompanyings. Fig 1. 2. 3. 4 represent four Rails eighteen inches long and about two and one half inches square.

Fig 0 represents a rail or beam situated midway between the two extremities of the frame and which passes from the front to the back side of the machine and is made fast to the rails Fig 1. 3. by tenons and mortises. The four Rails 1. 2. 3 4. are connected with the posts at the four corners of the frame by means of tenons and mortises. The rails at the top of the machine upon which the revolving brush, the revolving Knife and the permanent Rollers rest are represented by figs 5 & 6.

Fig 7. Represents a small pulley which is attached to a shaft Fig 8. This shaft is made of steel and that part of it which is between the two rails Figs 5 & 6. is made nearly in the form of a curriers Knife. A fly wheel Fig 9 is attached to the opposite end of this shaft. A. represents an elastic roller, the shaft of which is made of iron and the surface is covered with leather or some other elastic substance. This Roller

8724X revolves in two boxes made in the head or top of two steel spring a. a. which are made fast to the rails Figs 1 & 3. b. b. represent small upright posts in which are placed two screws c. c. to regulate the springs. All the rollers are of the same size. C represents a permanent compressing Roller which is made of iron and plays in Boxes made in the two rails. Figs 5 & 6. a corresponding Roller B. is similarly situated is placed on the other side of the Knife. D represents an iron roller which revolves in two boxes made at the extremities of the moveable frame E. and is situated equi-distant from ~~from~~ the Knife and elastic roller below them, this frame plays in grooves made in the inner surface of the small upright posts. d. d. and is moved by the lever F. This lever and consequently the roller at the top of the frame are made fast in the position desired by a small iron hand upon the upper surface of the lever which comes in contact with a serrated piece of iron which is made fast to the post d. The fulcrum of this lever is made fast to the rail or beam Fig O. G represents an iron roller which revolves in boxes made in the two end pieces of the moveable frame H. This frame plays on two pivots one of which is represented at e. a corresponding one is situated on the opposite side of the machine The roller G. is situated directly under the roller C. This moveable frame is made fast in the desired position by a small iron hand which comes in contact with a serrated spring made fast in rail Fig 2. † A corresponding roller frame and spring are situated in the same manner on the opposite side of the Knife I. is a circular brush which revolves in two boxes f. f. which are placed upon the rails Figs 5. & 6. This brush is situated directly above the elastic Roller: and is of the size of the rollers or a little larger. A small pulley is attached to the extremity of the shaft of the brush which is driven by a band which connects this pulley with another marked K. in the in the drawings which is made fast to the larger pulley or wheel L. This
larger pulley or wheel is made fast to a shaft M. which pas-
ses through and revolves in the posts N.N. P. is a band which
passes over the wheel or pulley L. and the small pulley on the
end of the shaft Fig. 8. The pulley L. is about eighteen inch
es in diameter; and the pulley K is about eight inches in di
ameter. Q represents a sweep which is attached to an crank
made on the extremity of shaft M. R represents the lever
the fulcrum, which is made fast to the outside of rail fig.
6. Two hands which are situated equidistant from the fulcrum
one above and the other below are attached to the lever. The
fulcrum is situated midway between the post at the end of the
machine into which the shaft M plays, and the centre of the fly
wheel. The hands before mentioned play into and turn a
small serrated wheel which is made fast to one end of the per
manent Roller B. and turns it. The skin from which the hair
is to be extracted is inserted between the permanent Roller C.
and the moveable roller G and also between the elastic
roller A and the moveable roller D and is thence conveyed
under the knife and then passes out between the permanent
Roller B. and the moveable roller situated directly under it. The moveable
rollers are lowered when a skin is inserted or taken out;
When the machine is set in motion they are raised sufficiently
high to compress and hold the skin in the proper position and to con
vey it by their revolutions to the knife. The moveable roller D is
raised in order to compress the skin and bring it in contact
with the revolving knife. as the knife revolves the hair is brought
in contact with the revolving elastic roller and is extracted by
the roller and knife. The revolving brush removes the extracted hair
from the surfaces of the knife and Roller. The machine is set in
motion by turning the wheel or pulley L. by the handle K. If the
machine is propelled by hand power. It may be propelled by any

8724X other power:) What I claim as my Invention and for which letters Patent are asked are the application of the revolving knife the elastic and other rollers to this purpose as well as the general arrangement of the several parts of the machinery. and their application to effect the purpose designed as above specified and described Witnesses
John Otis
J. Young Scammon Seth Graham (1224 [illegible])

(Patented 27 March 1835)

Drawing